Figure 1:
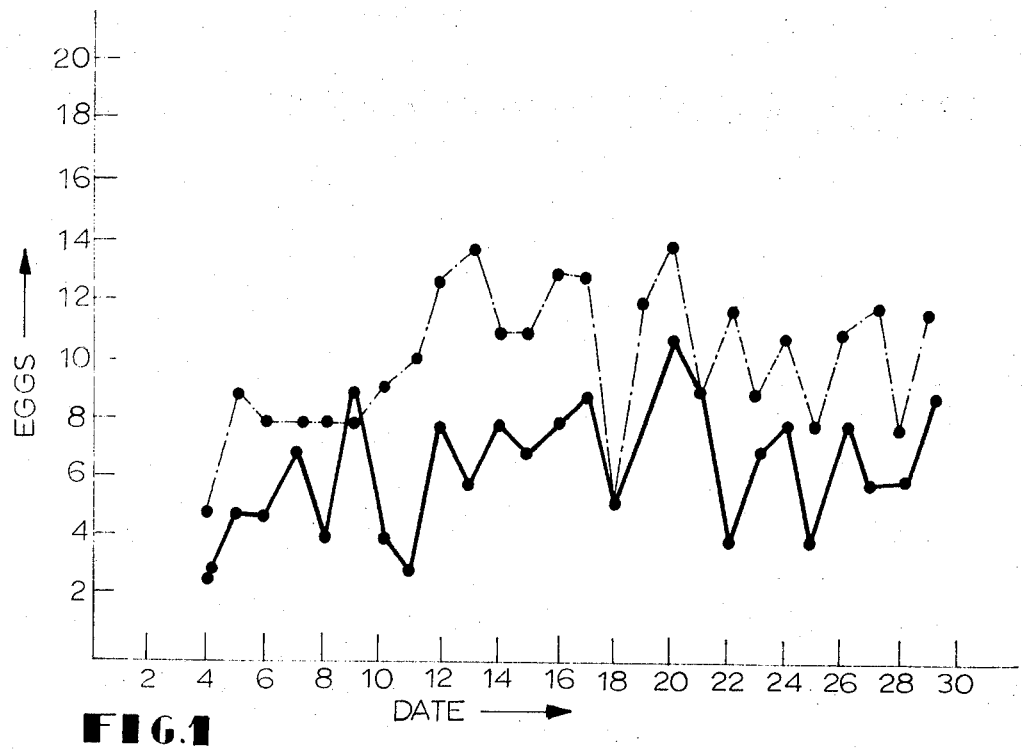

United States Patent [19]
Naito et al.

[11] 3,864,482
[45] Feb. 4, 1975

[54] METHOD FOR FACILITATING EGG-LAYING RECUPERATION OF HEN UNDER MOULTING AND AQUEOUS PREPARATION THEREFOR

[75] Inventors: Etsuo Naito, Han-Nou; Katsuhide Tanaka, Toyota, both of Japan

[73] Assignee: Eisai Co., Ltd., Bunkyo-ku, Tokyo, Japan

[22] Filed: Oct. 3, 1973

[21] Appl. No.: 403,073

[30] Foreign Application Priority Data
Oct. 9, 1972    Japan................................ 47-100657

[52] U.S. Cl. .............................................. 424/177
[51] Int. Cl. ............................................. A61k 27/00
[58] Field of Search.................... 260/112.5; 424/177

[56] References Cited
UNITED STATES PATENTS
3,778,427    12/1973    Flouret ........................... 260/112.5
3,780,014    12/1973    Flouret ........................... 260/112.5

OTHER PUBLICATIONS
Sievertsson et al., Journal of Medicinal Chemistry, (1972), Vol. 15, No. 3, Pages 222–225 relied on.

Primary Examiner—Elbert L. Roberts
Attorney, Agent, or Firm—Wenderoth, Lind & Ponack

[57] ABSTRACT

Novel method for facilitating egg-laying recuperation of hen in the course of moulting is provided which comprises administrating LH-RH through intramuscular injection to hen under moulting as well as an aqueous preparation therefor; LH-RH being a substance belonging to decapeptide stimulating secretion of hormone capable of forming corpus luteum. Period of time for moulting of hen thus treated is considerably shortened and recovery of the egg-laying is facilitated to result in an increment of the total egg-layings throughout the year.

5 Claims, 2 Drawing Figures

METHOD FOR FACILITATING EGG-LAYING RECUPERATION OF HEN UNDER MOULTING AND AQUEOUS PREPARATION THEREFOR

This invention relates to a novel method for facilitating egg-laying recuperation of hen during moulting.

Hen usually keeps right on laying eggs almost the year around, with exception of term of the moulting that takes place at a time of from summer to autumn of every year.

Continued egg-laying for an elongated period of time apparently results in a considerable energy loss of hen. It is therefore considered that a recess of the egg-laying for a certain period of time would be necessary in order to recover from its exhausted body constitution, and the yearly moulting may arise incidental to the matter.

Since an elongated period of time consumed for completion of moulting undesirably affects economical condition of poultry-farmer, it has been eager in the art for shortening of the period of moulting as much as possible to result in an increase of the rate of egg-laying.

It has recently been brought an artificially controlled moulting of hen by subjecting to a forced fasting and simultaneously a suitable abstinence from water for the purpose of attaining an increased rate of egg-laying throughout the year. All the attempts effected therefor including that abovementioned have not, however, been succeeded, and at the present time the actual circumstance is that there is nothing found a method for settling the matter.

According to our extensive research investigations on various medical substances, it has unexpectedly been found that the term of moulting of hen is considerably shortened and accordingly the rate of egg-laying is markedly increased, when Luteinizing Hormone-Releasing Hormone, which is hereinafter simply called LH-RH, is administered to hen under moulting.

LH-RH per se employed as active ingredient in this invention is a substance which possesses activity of secreting hormone capable of forming corpus luteum. The substance was first isolated in a purified form from hypothalamus of pig and defined its chemical constitution by A.V. Schally et al. (1971). The substance was assured as a decapeptide having the following chemical structure: Pyroglutamyl-histidyl-tryptophyl-seryl-tyrosyl-glycyl-leucyl-arginyl-prolyl-glycine amide [See Biochemical Biophysical Research Communication, 44, No. 2, page 459 (1971).]

LH-RH may be obtained by extraction by hypothalamus of pig, in accordance with the teachings of A. V. Schally et al. as aforementioned. The process for carrying out the extraction, however, has the shortcomings involving difficulty in obtaining the raw material, complexity of the procedures required and deficiency in reproductivity with a definite average yield and an expected purity of the contemplated product. It is therefore rather recommendable as advantageous to realize formation of the product by a chemical synthesis in lieu of the extraction.

In one exemplification of the chemical synthesis of LH-RH, leucyl-alginyl-prolyl-glycine amide is subjected to reaction with N-protected or N-unprotected pyroglutamyl-histidyl-tryptophyl-seryl-tyrosyl glycine or a reactive derivative of said amino acid, and the N-protected group if any present in the resulting reaction product is splitted off by a conventional manner.

In practice of the method of the present invention, LH-RH is administered by intramuscular injection to hen under moulting in a dose of from $1.0\gamma$ to $30\gamma$ preferably dissolved in saline water. The amount of dose of LH-RH may vary within the range in dependence of the kind of hens to be treated and other relating variables.

The administration by muscular injection of LH-RH is usually effected in the latter term of moulting.

It should be noted that the method of this invention is equally adapted for application to both the hens under natural and artificially forced moultings.

According to the method of the present invention, it is possible, as will be seen from the latter description, to increase in a simple manner the egg-laying rate. It may thus be said that the invention complies with the demand for a long time by the poultry farmer.

Following Examples serve to further illustrate the method of the present invention.

EXAMPLE 1

Two flocks were prepared each consisting of 21 hens of White leghorn under artificially forced moulting caused by fasting for 7 days in combination with a suitable abstinence from water for about 3 days; one of the flocks being for control and the other for the test by injection of LH-RH in accordance with the method of the present invention.

After a lapse of 10 days of the moulting, $10\gamma$ of LH-RH dissolved in 1 ml of saline water were injected to pectral muscle of every hen of the test flock. After the lapses of 6 and 10 days from the date of first injection, the respective injections of $10\gamma$ of LH-RH to the hens under test were followed in the manner same as that employed in the first injection.

Apart from the above, every 1 ml of plain saline water containing no LH-RH was administered three times to every hen of the control flock in the manner same as those mentioned in the preceding paragraph.

Egg-layings were observed for each flock, and the resultant data were listed in the following Tables 1 and 2.

Table 1

Effect of LH-RH on egg-laying of hen

| A | $B_1$ | $B_2$ | $C_1$ | $C_2$ |
|---|---|---|---|---|
| 0 | 0 | 0 | 0* | 0 |
| 4 | 3 | 3 | 5 | 5 |
| 5 | 5 | 2 | 9 | 6 |
| 6 | 5 | 1 | 8* | 1 |
| 7 | 7 | 2 | 8 | 1 |
| 8 | 4 | 1 | 8 | 1 |
| 9 | 9 | 1 | 8 | 0 |
| 10 | 4 | 0 | 9* | 2 |
| 11 | 3 | 0 | 10 | 0 |
| 12 | 8 | 1 | 13 | 1 |
| 13 | 6 | 0 | 14 | 1 |
| 14 | 8 | 3 | 11 | 0 |
| 15 | 7 | 1 | 11 | 0 |
| 16 | 8 | 1 | 13 | 3 |
| 17 | 9 |  | 13 |  |
| 18 | 5 |  | 5 |  |
| 19 | 8 |  | 12 |  |
| 20 | 11 |  | 14 |  |
| 21 | 9 |  | 9 |  |
| 22 | 4 |  | 10 |  |
| 23 | 7 |  | 9 |  |
| 24 | 8 |  | 12 |  |
| 25 | 4 |  | 8 |  |
| 26 | 8 |  | 11 |  |
| 27 | 6 |  | 12 |  |
| 28 | 6 |  | 8 |  |
| 29 | 9 |  | 12 |  |

Table 1-Continued

Effect of LH-RH on egg-laying of hen

| A | $B_1$ | $B_2$ | $C_1$ | $C_2$ |
|---|---|---|---|---|
| Total | 171 Eggs | 16 Hens | 262 Eggs | 21 Hens |

A : Term (days) from the first injection of LH-RH;
$B_1$ : Number of eggs laid by the hens of control flock in the corresponding date;

$B_2$ : Number of the hens of control flock recuperated the egg-laying up to 16th day; and
$C_1$ : Number of eggs laid by the hens of test flock in the corresponding date;
$C_2$ : Number of the hens of test flock recuperated the egg-laying up to 16th day; and
\* : $10\gamma$ dose by injection of LH-RH for every hen of the test flock.

Table 2 a) Rate of egg-laying of each individual hen injected

| Mark attached to every hen | Total eggs laid by every hen for 29 days | Number of eggs × 100 29 days |
|---|---|---|
| 1 | 15 | 75.0 |
| 2 | 2 | 11.8 |
| 3 | 20 | 76.9 |
| 4 | 5 | 20.0 |
| 5 | 11 | 45.8 |
| 6 | 4 | 30.8 |
| 7 | 14 | 66.7 |
| 8 | 18 | 72.0 |
| 9 | 16 | 64.0 |
| 10 | 3 | 21.4 |
| 11 | 17 | 65.4 |
| 12 | 13 | 72.2 |
| 13 | 16 | 64.0 |
| 14 | 10 | 71.4 |
| 15 | 20 | 76.9 |
| 16 | 13 | 50.0 |
| 17 | 18 | 69.2 |
| 18 | 17 | 68.0 |
| 19 | 16 | 64.9 |
| 20 | 5 | 25.0 |
| 21 | 9 | 50.0 |
| Average/day | 12.5 eggs | 55.3 % | b) Rate of egg-laying of each individual hen without injection

| 22 | 9 | 52.9 |
|---|---|---|
| 23 | 11 | 64.7 |
| 24 | 17 | 65.4 |
| 25 | 5 | 20.8 |
| 26 | 9 | 42.8 |
| 27 | 0 | 0 |
| 28 | 0 | 0 |
| 29 | 1 | 4.3 |
| 30 | 18 | 70.3 |
| 31 | 8 | 36.4 |
| 32 | 8 | 38.1 |
| 33 | 14 | 56.0 |
| 34 | 12 | 48.0 |
| 35 | 1 | 4.0 |
| 36 | 19 | 73.1 |
| 37 | 10 | 71.4 |
| 38 | 0 | 0 |
| 39 | 20 | 76.9 |
| 40 | 5 | 31.3 |
| 41 | 4 | 22.2 |
| 42 | 0 | 0 |
| Average/day | 8.1 eggs | 37.8% |

Figure 2:
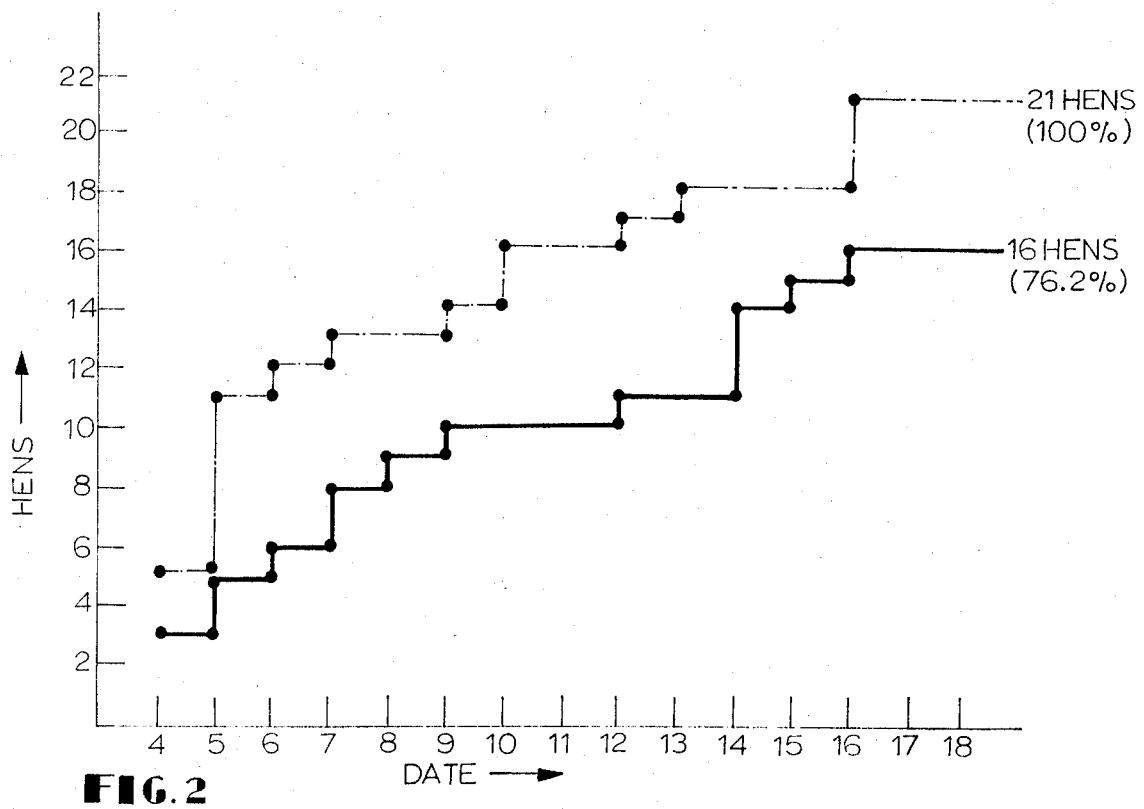

The accompanying drawings, i.e., FIGS. 1 and 2, give clearer informations regarding the data enumerated in the above Tables 1 and 2; wherein:

In FIG. 1, the number of eggs are given in the ordinate, and the terms by day from the LH-RH administration are given in the abscissa. Further, the full line in the Figure is for the flock of control hens and the brocken line is for the flock of hens administered with LH-RH.

FIG. 2 shows the number of hens recuperated the egg-laying. In Figure, the number of hens is given in the ordinate and the term by day from that of the LH-RH administration for the hens of test flock is given in the abscissa. Further, the full line in Figure is for the flock of control hens and the broken line is for the flock of hens administered with LH-RH.

As is seen from Figures, the rates of egg-laying of the hens treated with LH-RH in accordance with the present invention are superior to those of the control hens.

It will be thus understood that the method of this invention is effective for improving the rate of egg-laying of hen worth appreciable from commercial viewpoint in poultry farming.

What is claimed is:

1. A method for facilitating egg-laying recuperation of hen during moulting which comprises administering $1.0\gamma$– $30\gamma$ of LH-RH through intramuscular injection to hen under natural or artifically forced moulting.

2. A method as claimed in claim 1 wherein a dose of from $1.0\gamma$ to $30\gamma$ of LH-RH dissolved in saline water is administered once during the latter term of moulting.

3. An aqueous preparation of LH-RH to be administered to hen under moulting for facilitating egg-laying recuperation, which contains $1.0\gamma$ to $30\gamma$ of LH-RH per milliliter of saline water.

4. A method as claimed in claim 1 wherein a dose of from $1.0\gamma$ to $30\gamma$ is administered a few times in approximately 5–10 day intervals during the latter term of moulting.

5. A method as claimed in claim 4 wherein $10\gamma$ dosages of LH-RH are administered.

* * * * *